United States Patent

Carlson et al.

[11] Patent Number: 4,691,600
[45] Date of Patent: Sep. 8, 1987

[54] PIPE SHAVER

[76] Inventors: Larry M. Carlson; Douglas J. Braun, both of 4903 S. Cedar Lake Rd., Minneapolis, Minn. 55416

[21] Appl. No.: 799,821

[22] Filed: Nov. 20, 1985

[51] Int. Cl.⁴ ............................................. B23B 5/16
[52] U.S. Cl. ................................. 82/4 C; 144/205; 408/80; 408/202
[58] Field of Search .............. 82/4 C; 408/80, 91, 408/125, 211, 200, 201, 202; 144/205

[56] References Cited

U.S. PATENT DOCUMENTS

| | | | |
|---|---|---|---|
| 1,863,067 | 6/1932 | Perry | 408/80 |
| 2,641,944 | 6/1953 | Lattoon | 144/205 X |
| 2,716,812 | 9/1955 | Noonan . | |
| 2,821,781 | 2/1958 | Zeiler . | |
| 2,869,413 | 1/1959 | Anderson . | |
| 3,075,219 | 1/1963 | Ott | 144/205 X |
| 3,279,059 | 10/1966 | Keiter . | |
| 3,396,467 | 8/1968 | Scocozza . | |
| 3,601,891 | 8/1971 | Destito . | |
| 3,603,182 | 9/1971 | Jackman et al. | 82/4 C |
| 3,636,803 | 1/1972 | Miller | 82/4 C |
| 3,714,712 | 2/1973 | Hoffman . | |
| 3,732,618 | 5/1973 | Lorenz . | |
| 3,803,895 | 4/1974 | King, Jr. . | |
| 3,817,649 | 6/1974 | Medney | 82/4 C X |
| 3,999,452 | 12/1976 | Larsen | 82/4 C |
| 4,227,431 | 10/1980 | Wells . | |
| 4,289,430 | 9/1981 | Shashaty | 408/1 R |
| 4,317,279 | 3/1982 | Smith et al. . | |
| 4,418,591 | 12/1983 | Astle . | |
| 4,443,943 | 4/1984 | Maruyama . | |
| 4,446,620 | 5/1984 | Velte . | |

OTHER PUBLICATIONS

Ameron, "Bondstrand M74 Pipe Shaver" Operating Instructions.
Ameron, "Bondstrand Assembly Instructions—Adhesive-Bonded Quick-Lock Joints".

Primary Examiner—Z. R. Bilinsky
Attorney, Agent, or Firm—Burd, Bartz & Gutenkauf

[57] ABSTRACT

A pipe shaver having an elongated mandrel and a plurality of cutting tools is used to shave the outer surface of a predetermined length of a pipe. The mandrel is secured to a cup-shaped body having a plurality of lugs for carrying circular cutting tools. The mandrel and body are separated from each other to provide an annular space for accommodating the shaved end of the pipe. A power unit having an electric motor is used to rotate the shaver.

15 Claims, 7 Drawing Figures

PIPE SHAVER

FIELD OF INVENTION

The pipe shaver is an apparatus used to machine cylindrical member and pipes. The machining operation includes milling and shaving of outer surfaces of ends of pipes to facilitate the bonding of the pipes to fittings and couplings.

BACKGROUND OF INVENTION

Pipes made of reinforced plastic are used to carry fluid, such as liquids and gases. Elongated lines of pipe utilize fittings, couplings and elbows to secure pipes in end-to-end relationship. The couplings and pipe ends are telescoped together. Adhesives are used to bond the matting surfaces of the pipes and couplings. The bonding of the pipe and coupling materials must be complete to provide a fluid-type joint and a structurally stable pipe line. The integrity of the joint is enhanced when the mating surfaces of the pipe and coupling have close tolerances. These tolerances are achieved by shaving the outer end of the pipe to provide a smooth uniform diameter cylindrical surface. The inside end surface of the coupling are sanded smooth so that there is a close fit when the coupling is placed on the shaved end of the pipe. Adhesives are applied to the inside surface of the coupling and the shaved end of the pipe to bond the coupling to the pipe. Pipe shavers having cutting tools are used to mill down the outside of the outer end of the pipe. The pipe shavers can be manually rotated or driven with power units. The cutting tools of the pipe shavers are adjustable for accommodating different sized pipes. This requires set up and adjustment in the field.

SUMMARY OF INVENTION

The invention is directed to an apparatus for milling the outer surface of a tubular member for a desired length to a selected diameter. The apparatus has built-in tolerances that do not need adjustment to make a correct cut for a given size tubular member. The apparatus has a body accommodating cutting tool means located about an elongated mandrel. The mandrel is spaced inwardly from the cutting tool means to allow the tubular member to be located between the mandrel and the cutting tool means. A power unit is used to rotate the apparatus as it is moved onto a pipe. The mandrel moves into the passage of the tubular member as the cutting tool means shaves off material from the outer surface of the tubular member. The apparatus and power unit are relatively light in weight so that they can be handled by one person in a relatively confined space.

A preferred embodiment of the invention is a pipe shaver operable to remove material from the outer surface of an end section of a plastic pipe or similar tubular member having a longitudinal passage. The apparatus has a generally cup-shaped body including a generally cylindrical side wall joined to a transverse base. A plurality of lugs on the open end of the side wall are circumferentially spaced from each other and extend in a longitudinal direction away from the base. Cutting tool means are mounted on each of the lugs. The cutting tool means comprises generally circular discs having cutting portions that extend inwardly from each lug. A mandrel extends into the cup-shaped body and is secured to the base. The mandrel has a cylindrical outer surface that is spaced inwardly from the side wall and the cutting tools to provide an annular space for accommodating the end of the pipe. The mandrel has a size or diameter to slidably fit into the passage of the pipe to concentrically locate the shaver on the pipe. The mandrel has a length substantially longer than the body so that it functions as a pilot and stabilizer for the shaver as it is rotated relative to the pipe. A power unit, such as a combined gear head and electric motor, commonly called an electric drill, is used to rotate the shaver. When the mandrel is moved into the passage of the pipe and the shaver is rotated with the power unit, the cutting tool means removes material from the outer surface of the pipe. The shaved end of the pipe moves into the annular space. This movement continues until the end of the pipe abuts against the base whereby a predetermined length of pipe is shaved.

IN THE DRAWING

DETAILED DESCRIPTION

Figure 1:
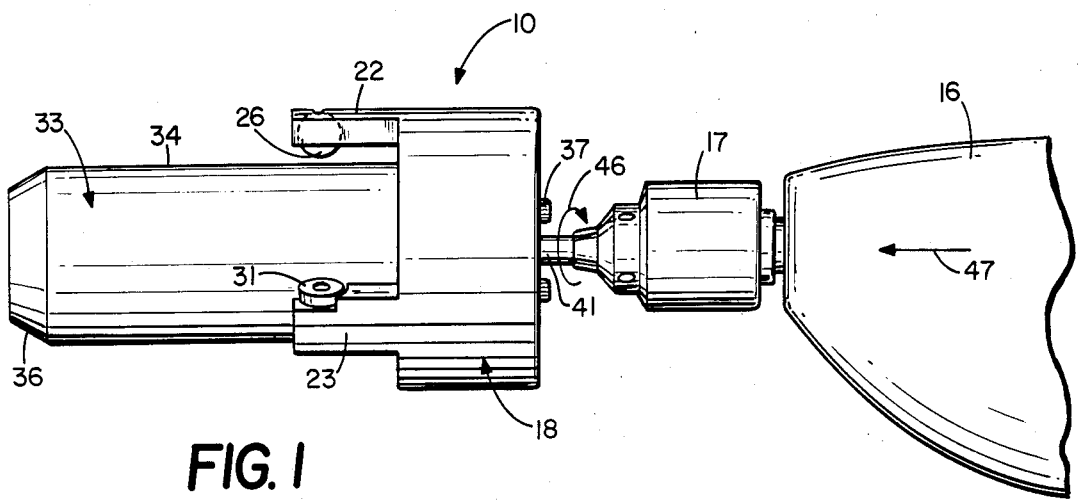
FIG. 1 is a side view of the shaving apparatus of the invention connected to an electric drive unit.
Figure 2:
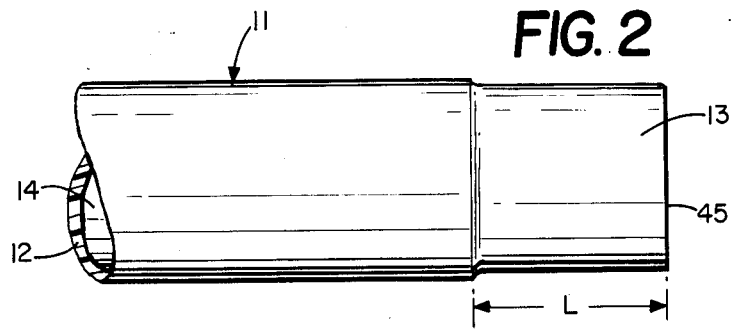
FIG. 2 is a side view of an end section of a tubular member having material removed from a portion thereof.
Figure 5:
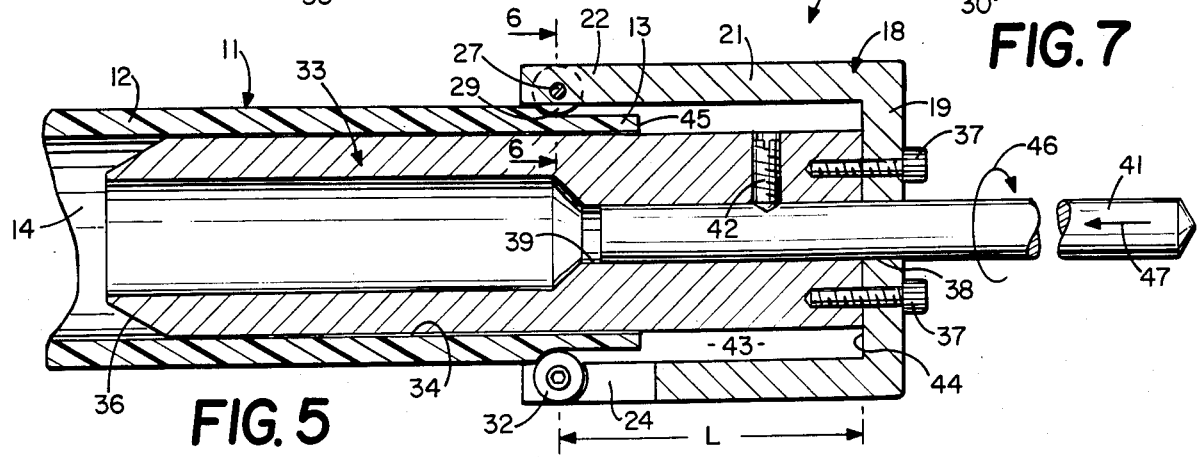
FIG. 5 is a foreshortened enlarged sectional view taken along line 5—5 of FIG. 3 in working relation with a tubular member.

Referring to FIGS. 1 and 5, there is shown an apparatus of the invention, indicating generally at 10, for shaving an end section of a tubular member, such as a pipe. Apparatus 10 is called a shaver used to mill a circumferential end section 13 of the outside surface of a pipe indicated generally at 11, such as a plastic pipe, so it can receive a coupling, such as an elbow (not shown). In use the coupling is telescoped onto the milled section 13 of pipe 11. The inside diameter of the end of the passage of the coupling that fits on the milled section of the pipe. The coupling has a close sliding fit on the milled section of the pipe and is secured thereto with bonding material, such as chemically resistant thermosetting adhesives. As shown in FIG. 2, pipe 11 has a cylindrical wall 12 and an end section 13. Pipe 11 is a continuous cylindrical tubular member made of reinforced plastic, such as glass fiber reinforced plastic. End section 13 is shaved or milled down a longitudinal distance L with the use of apparatus 10 of the invention. Pipe 11 has a continuous cylindrical inside passage 14 for carrying fluid and fluid-like materials and cables and wire.

A power unit 16, such as an air or electric drill having an electric motor, is used to rotate apparatus 10. A chuck 17 mounted on the output drive shaft of power unit 16 has a collet assembly or jaws (not shown) used to releasably connect power unit 16 to apparatus 10. Other types of power units can be used to rotate apparatus 10 to mill down end section 13 of pipe 11.

Figures 3, 4:
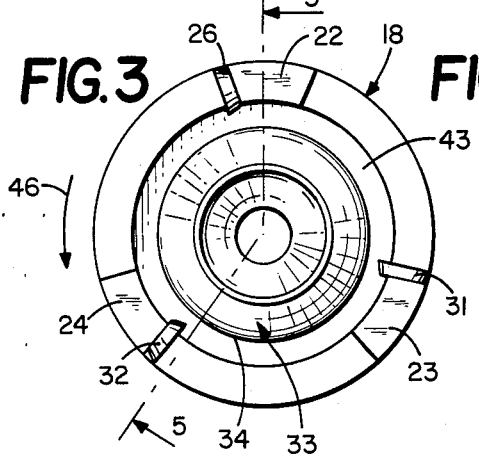
FIG. 3 is an enlarged front view of the shaving apparatus of FIG. 1.
FIG. 4 is an enlarged rear view of the shaving apparatus.
Figure 6:
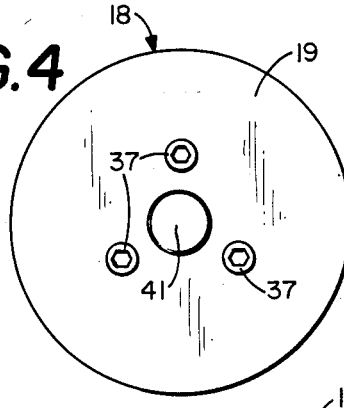
FIG. 6 is an enlarged sectional view taken along line 6—6 of FIG. 5.
Figure 7:
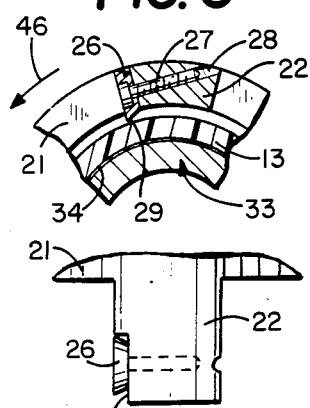
FIG. 7 is a top view of a lug and cutting disc mounted thereon.

As shown in FIGS. 1 and 5, the apparatus or shaver 10 has a tool holder comprising a cup-shaped body 18 having a flat circular base 19 and a cylindrical side wall 21. Three lugs 22, 23, and 24 project forwardly from the forward end of side wall 21. Lugs 22, 23, and 24, as shown in FIG. 3, project parallel to the longitudinal axis of body 18 and are equally spaced from each other about the circumference of forward end of side wall 21. Lugs 22, 23, and 24 support cutting tools 26, 31, and 32 that are used to shave or mill the outside of end section 13. Referring to FIGS. 3, 6, and 7, lug 22 has a recess 30 on its forward side accomodating cutting tool 26. Tool 26 is a circular metal disc having a cone shaped outer surface terminating in an outer peripheral cutting edge 29. A portion of edge 29 is located radially inward from the inside surface of lug 22. This portion is the cutting portion. The depth of cut of disc 26 is limited to the distance that the disc projects radially inward from lug 22. The depth of cut of the tools 26, 31, and 32 can be adjusted by using larger cutting discs. A bolt 27 threaded into a threaded hole 28 in lug 22 secures cutting tool 26 to lug 22. Bolt 27 can be released or turned out of lug 22 to allow cutting tool 26 to rotate so that a new part of cutting edge 29 is used to mill end section 13 of pipe 11. This compensates for wear and breakage of cutting edge 29 of tool 26. Cutting tools 31 and 32 are identical to cutting tool 26. They are mounted on the forward side of lugs 23 and 24. Bolts (not shown) releasably mount tools 31 and 32 on lugs 23 and 24. Tools 31 and 32 can be rotated to compensate for wear of their cutting edges. Tools 26, 31, and 32 are circular discs made of high carbon steel. Other types of materials can be used to make cutting tools 26, 31, and 32.

Returning to FIGS. 1 and 6, an elongated cylindrical mandrel 33 extends forwardly from base 19 of the tool holder. Mandrel 33 has an outer cylindrical surface 34 having a size to fit into passage 14 of pipe 11 with a sliding fit relationship relative to the inside wall of pipe 11. The forward end 36 of mandrel 33 has inwardly directed annular tape to guide and facilitate the insertion of mandrel 33 into the open end of pipe 11. Mandrel 33 has a longitudinal length substantially longer than the longitudinal length of body to longitudinally align the shaver 10 with pipe 11. As shown in FIG. 5, mandrel 33 has a length that is twice as long as the length of body 18. The long mandrel 33 maintains the concentric relationship of cutting tools 26, 31, and 32 relative to pipe 11.

A plurality of bolts 37 secure the rear end of mandrel 33 to base 19. Bolts 37 surround a hole 38 in the center of base 19. Hole 38 is aligned with a hole 39 in mandrel 33. An elongated cylindrical shaft 41 extends through hole 38 into hole 39. A set screw or similar fastener 42 secures shaft 41 to mandrel 33. Other structures can be used to attach mandrel 33 to body 18.

Cylindrical side wall 21 is spaced outwardly from the outside of mandrel 33 and forms therewith an annular space 43. Annular space 43 accommodates end section 13 of pipe 11 as shaver 10 is used to mill the outside surface of pipe end section 13. The inside surface 44 of base 19 open to annular space 43 functions as a stop that is contacted by end 45 of pipe 11. Mandrel 33 guides shaver 10 into pipe 11 until pipe end 45 abuts against stop surface 44. This automatically determines the length L of shaved end section 13 of pipe 11. Distance L from cutting tools 26, 31, and 32 to stop surface 44, determines the length of the shaved end section 13 of pipe 11. The length L of the cut on pipe end section 13 is predetermined by the structure of shaver 10.

In use, chuck 17 is clamped unto the free end of shaft 41 as shown in FIG. 1. Mandrel 33 is slipped into the open end of a pipe 11. The pipe 11 is retained in a position so that it does not rotate. Power unit 16 and shaver 10 are moved toward pipe 11 with mandrel 33 moving into pipe passage 14. Power unit 16 rotates pipe shaver 10 in the direction of the arrow 46 thereby moving cutting tools 26, 31, and 32 to shave off a portion of the outside surface of end section 13 of pipe 11. This shaving or milling action continues until pipe end 45 abuts against the stop surface 44. Shaver 10 is then withdrawn from pipe 11.

Shaver 10 is calibrated to make the correct cutting size for a given diameter of pipe. It has built-in tolerances that do not need adjustment. Shaver 10 and power unit 16 has a relatively small size and can be used in confined spaces such as in trenches or ditches for underground pipe. Shaver 10 and power unit 16 are relatively light in weight so they can be handled by one person thereby saving considerable time and labor. A set up or adjustment of the shaver 10 is not required to effectively shave off or mill a section of the end of pipe 10. Common commercial fiber reinforced plastic pipe comes in different diameter sizes. These sizes include 1,1½,2,3,4,6,8 10, and 12 inch diameter pipe. Shavers having diameters to accommodate the different sized pipes are used to mill end sections of the pipes.

There has been shown and described an embodiment of the shaver of the invention for milling the outer end of a pipe. Changes in the parts and sizes of the parts can be made without departing from the invention. The invention is defined in the following claims.

The embodiments of the invention in which an exclusive property or privilege is claimed are defined as follows.

1. An apparatus for removing material from the outer surface of an end section of a tubular member having a cylindrical longitudinal passage in said end section comprising: a generally cup-shaped body having a longitudinally extended cylindrical side wall with a first end and a second end, a transverse base joined to the first end of the wall, a plurality of lugs joined to the second end of the wall, said side wall, base, and lugs comprising a one-piece cup shaped body, said lugs being circumferentially spaced from each other, each of said lugs being longitudinally away from said second end, each lug having a forward side with an outer end, a recess in the outer end of said forward side, a cutting tool located in each recess connected to each lug for removing material from the outer surface of the end section of the tubular member, each cutting tool comprising a cutting disc having a flat portion in engagement with the forward side of the lugs, a cone shaped outer surface, and an outer circular cutting edge at the large end of said cone shaped outer surface, each disc located in a radial plane extended through the axis of rotation of the apparatus, means securing the discs to the lugs to hold said flat portion thereof in engagement with the forward sides of the lugs and locate a portion of the cutting edge radially inwardly of said lugs, a mandrel having an inner end positioned in engagement with the base, means extended through said base to non-rotatably secure the mandrel to the base, said mandrel having a cylindrical outer surface spaced inwardly from said side wall providing an annular space and a forward end projected longitudinally away from the body, said cylindrical outer surface being of a size to fit into the cylindrical longitudinal passage of the tubular member to guide the apparatus into said end section of the tubular member, said base having an annular stop surface engageable with the tubular member to limit the length of the outer surface of the tubular member from which material is removed, means secured to the mandrel adapted to be connected to means for rotating the apparatus about the longitudinal axis of the mandrel whereby when the mandrel is moved into the passage of the tubular member and rotated with the means for rotating the apparatus whereby the cutting discs remove material from the outer surface of the end section of the tubular member providing a smooth uniform diameter cylindrical surface thereon, and the end section of the tubular member moves into said annular space until the end thereof abuts against the annular stop surface of the base.

2. The apparatus of claim 1 wherein: the mandrel has a length of at least twice the length of the body.

3. The apparatus of claim 1 wherein: each disc has a central hole concentrically surrounded by said outer circular cutting edge and said means securing the disc to the lug comprises a fastener extended through said hole.

4. An apparatus for removing material from the outer surface of an end section of a tubular member having a cylindrical longitudinal passage in said end section comprising: a body having a longitudinal axis, a first open end, a second closed end and ; cutting tool disc means connected to the second end of the body for removing material from the outer surface of the tubular member, a mandrel extended into said chamber, means non-rotatably securing the mandrel to the second closed end of the body, said mandrel extended along said longitudinal axis and forming with said body an annular space inwardly of the cutting tool disc means, means connected to the mandrel adapted to be attached to means for rotating the body and mandrel about said longitudinal axis, said cutting tool disc means having an outer circular cutting edge, a portion of said cutting edge extended into said annular space whereby when the apparatus is rotated and the mandrel is moved into the passage of the tubular member whereby the cutting tool disc means shaves material from the outer surface of the end section of the tubular member providing a smooth uniform diameter cylindrical surface thereon and the end section moves into said annular space, said second closed end of the body having stop means adjacent the inner end of said annular space to limit the length of the outer surface of the tubular member from which material is removed.

5. The apparatus of claim 4 wherein: said body has a side wall spaced outwardly from the mandrel.

6. The apparatus of claim 4 wherein: said mandrel is longer than said body.

7. The apparatus of claim 4 wherein: said body has a plurality of circumferentially spaced lugs, and means mounting the cutting disc means on said lugs.

8. The apparatus of claim 7 wherein: each lug has a forward side, a recess in the outer end of said forward side, said cutting tool disc means being located in said recess.

9. The apparatus of claim 8 wherein: each cutting tool disc means is a disc having an outer cutting edge.

10. The apparatus of claim 8 wherein: said body is a generally cup-shaped member having a side wall and a base, and means securing said mandrel to said base.

11. The apparatus of claim 10 wherein: the means connected to the means for rotating the apparatus comprises an elongated shaft secured to said mandrel.

12. The apparatus of claim 10 wherein: said mandrel is an elongated cylindrical member having a longitudinal length longer than the longitudinal length of the body.

13. An apparatus for removing material from the outer surface of an end section of a tubular member having a cylindrical longitudinal passage in said end section comprising: a body having a generally cylindrical side wall, and a base joined to the side wall , said side wall having an inside generally cylindrical surface, a cylindrical mandrel of a size to fit into said passage means , non-rotatably securing the mandrel to said base of the body, said mandrel having an outer cylindrical surface spaced inwardly from the inside cylindrical surface forming an annular space for accommodating the end section of the tubular member, a plurality of lug means secured to said side wall located radially outward of the outer surface of the mandrel, each lug means having a forward surface, cutting tool means mounted on the lug means for shaving material from the outer surface of the end section of the tubular member, and releasable means mounting the cutting tool means on the forward surfaces of the lug means whereby the cutting tool means can be replaced to change the cutting depth thereof, said cutting tool means comprising discs having circular cutting edges, a portion of each cutting edge being located radially inward of the lug means engageable with the end section of the tubular member whereby when said body is rotated and the mandrel is moved into the passage of the tubular member, the cutting edge portion of the cutting tool means shaves material from the outer surface of the end section of the tubular member to provide a smooth uniform diameter cylindrical surface thereon, and the end section moves into said annular space, said base of the body having stop means adjacent the bottom of said annular space to limit the length of the outer surface of the tubular member from which material is shaved.

14. The apparatus of claim 13 wherein: each cutting disc has a central hole surrounded concentrically with said outer cutting edge , said means mounting the cutting tool means on the lug means including fasteners extended through said holes and secured to said lug means.

15. The apparatus of claim 13 wherein: said lug means has a recess in the outer end of the forward side of the lug means, said cutting discs being located in said recesses.

* * * * *